(No Model.)
2 Sheets—Sheet 1.
H. M. L. ANDERSON.
DEVICE FOR RAISING OR LOWERING CUTTING PLATES OF CRACKER MACHINES.
No. 562,788.
Patented June 30, 1896.
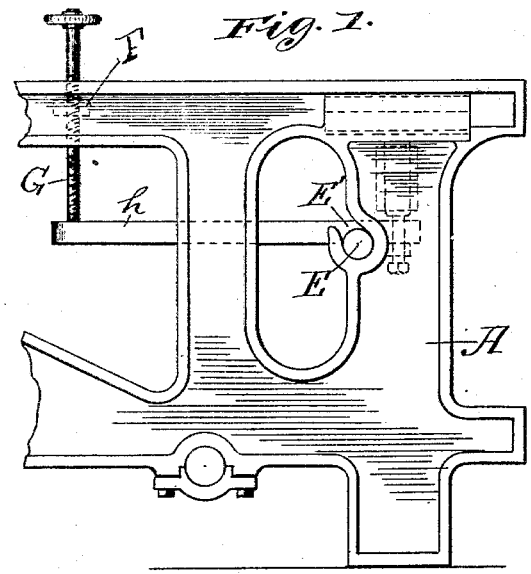
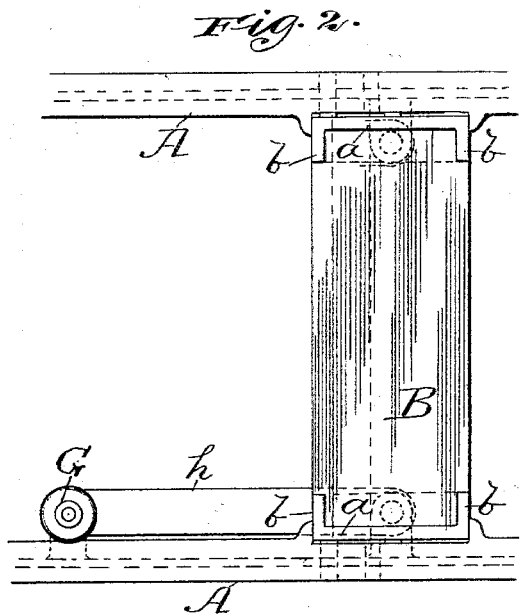
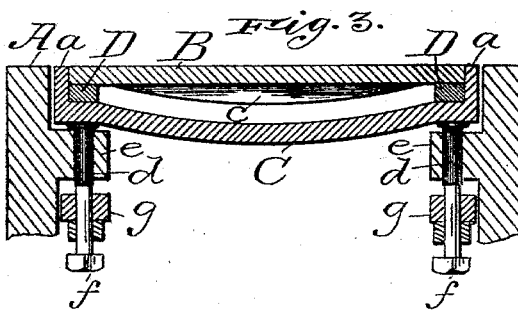
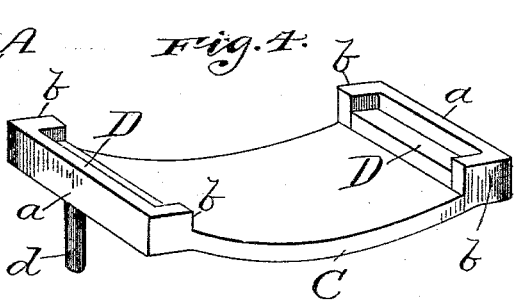
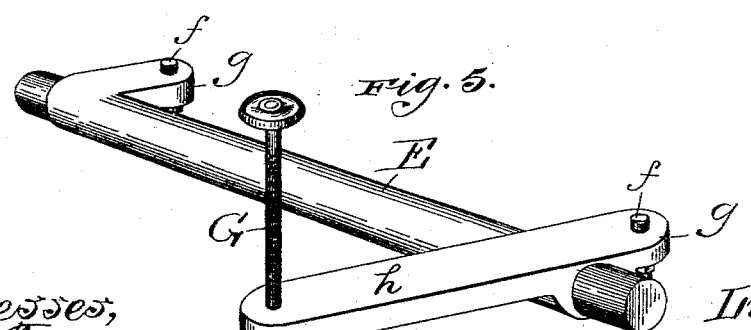
Witnesses:
Inventor,
Hans Martin Louis Anderson,
By Frank D. Thomason,
atty (No Model.)  2 Sheets—Sheet 2.
H. M. L. ANDERSON.
DEVICE FOR RAISING OR LOWERING CUTTING PLATES OF CRACKER MACHINES.
No. 562,788.  Patented June 30, 1896.
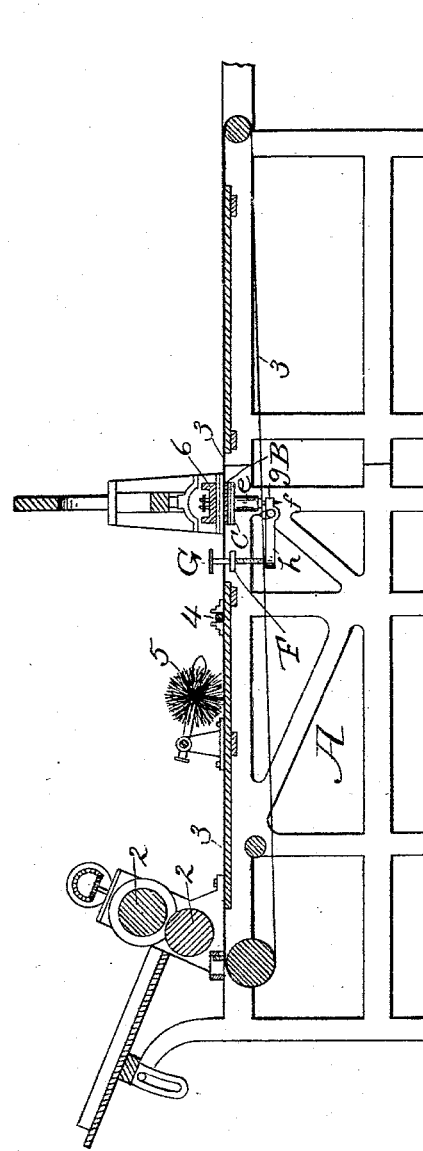
Fig-6-
WITNESSES
Louis S Thomason.
Horace F. White
INVENTOR
Hans Martin Louis Anderson
By
Frank D. Thomason
ATTORNEY.

UNITED STATES PATENT OFFICE.

HANS M. LOUIS ANDERSON, OF CHICAGO, ILLINOIS.

DEVICE FOR RAISING OR LOWERING CUTTING-PLATES OF CRACKER-MACHINES.

SPECIFICATION forming part of Letters Patent No. 562,788, dated June 30, 1896.

Application filed November 11, 1895. Serial No. 568,553. (No model.)

*To all whom it may concern:*

Be it known that I, HANS M. LOUIS ANDERSON, of Chicago, in the county of Cook and State of Illinois, have invented certain new and useful Improvements in Devices for Raising or Lowering the Cutting-Plates of Cracker-Machines, of which the following is a full, clear, and exact description, reference being had to the accompanying drawings and to letters and numerals of reference marked thereon.

The object of my invention is to provide simple and effective means for guiding, cushioning, and vertically adjusting the cutting-plate of a cracker-making machine, so that the thrust of the cutting-blades will not be met by a solid stationary impact, as they cut through the layer of dough on the apron, but by a yielding impact, thus preserving the blades and avoiding the otherwise great wear of said blades and the fabric of which the apron is made, substantially as hereinafter fully described, and as illustrated in the drawings, in which—

Figure 1 is a side elevation of a portion of a cracker-machine, illustrating the manner of applying my improvements. Fig. 2 is a plan view of the same. Fig. 3 is a transverse vertical section of my improved cutting-plate and conjunctive devices and portions of the frame of the cracker-machine supporting the same. Fig. 4 is a perspective view of my improved cutting-plate detached from the machine. Fig. 5 is a perspective view of the lever, the rock-shaft, and the adjusting-screw used in conjunction with the cutting-plate; and Fig. 6 is a longitudinal vertical section of the cracker-machine, showing my improvements applied thereto.

Referring to the drawings, A represents the outline of an ordinary cracker-machine stripped of the details of its construction, but illustrating how the dough is fed from a platform 1 to the rollers 2 2, rolled into a thin layer by said rollers 2 2, and deposited thereby onto the endless belt or apron 3, by which it is carried under a revolving brush 5, a gage-roller 4, (which evens the thickness of the layer,) and then to and under the cutting-blades 6 and over the cutting-plate used in conjunction therewith. Now I disclaim any invention in this particular form of cracker-machine or in the cutting-blades and means for reciprocating the same, and confine my improvements to the cutting-plate and devices used in conjunction therewith for adjusting the same vertically to or from the cutting-knives.

The cutting-plate B is preferably oblong in shape, but its corners are recessed so as to permit it to be seated and rest in the bed-plate C. The bed-plate C consists of an oblong plate of a length corresponding to the distance between the sides of the supporting-frame of the machine and of a width preferably the same as that of the superimposed cutting-plate. The end edges of the bed-plate are provided with vertical walls $a$, which arise therefrom a short distance and have short wings $b$, that extend along the longitudinal side edges of the same a short distance, so as to confine the ends of and prevent the horizontal displacement of the cutting-plate and make seats for the soft-rubber cushions D D. The ends of the cutting-plate rest on these cushions, which, it is obvious, will yield to a limited extent, sufficient to modify the impact of the cutting-blades.

The cutting-plate is preferably strengthened by a longitudinal fin $c$, depending from its under surface between the end portions thereof resting upon the cushions. The lower edge of this fin is curved, as shown, and in order to accommodate this curvature I make the bed-plate between the walls $a$ concave.

Depending vertically down from the ends of the bed-plate, midway between its sides, are studs $d$ $d$, which extend through the guide-lugs $e$ $e$, projecting inward with reference to said studs from the inner surface of the sides of the supporting-frame A, as shown in Fig. 3. The lower ends of these studs rest and are supported upon the upper ends of gage-screws $f f$, which are tapped up through the ends of the short arms $g$ $g$, projecting from the transverse rock-shaft E. This rock-shaft E is journaled, preferably, in open bearings E', located in the supporting-frame A, on a plane below the lower ends of the studs $d$. Projecting horizontally from this rock-shaft, in the opposite direction from arms $g$, preferably near one side of the supporting-frame, in alinement with adjacent arm $g$, is a long arm $h$. Near the extremity of arm $h$ it has bearing down upon it a gage-screw G, which is tapped through a suitable lug F, projecting inward from one side of the supporting-frame and is provided at its top with a suitable head to manipulate it with.

By properly manipulating the gage-screw G the rock-shaft is moved so that arms $g$ move upward, thus lifting the bed-plate and also the cutting-plate B through the medium of the studs $d$.

The gage-screws $f\ f$ might be dispensed with, but I greatly prefer their use, because they not only permit me to utilize them for a limited amount of adjustment, but enable me to raise the bed-plate to such an extent that the extremities of the studs will be within the bore of the guide-lugs $e$.

What I claim as new is—

In a cracker-machine the supporting-frame thereof having inwardly-projecting guide-lugs $e, e$, a bed-plate C having studs $d$ depending from their ends down through suitable guide-openings in said lugs, and having its end portions provided with vertical inclosing walls $a\ b$, cushions D placed within the space inclosed thereby, and a cutting-plate the ends of which rest on said cushions within the embrace of walls $a\ b$, in combination with rock-shaft E having its ends journaled in said supporting-frame and extending longitudinally under said bed-plate, corresponding arms $g, g$, projecting laterally from each end thereof, a longer arm $h$ projecting laterally in the opposite direction from one end of said shaft, set-screws $f, f$, tapped vertically up through arms $g$, and engaging the lower ends of studs $d$, and a gage-screw G engaging the lower arm $h$ substantially as and for the purpose set forth.

H. M. LOUIS ANDERSON.

Witnesses:
HORACE F. WHITE,
FRANK S. SHAW.